United States Patent [19]
Kraus

[11] Patent Number: 5,085,089
[45] Date of Patent: Feb. 4, 1992

[54] INFINITELY VARIABLE TRACTION ROLLER TRANSMISSION

[75] Inventor: Charles E. Kraus, Austin, Tex.

[73] Assignee: Excelermatic Inc., Austin, Tex.

[21] Appl. No.: 651,186

[22] Filed: Feb. 6, 1991

[51] Int. Cl.[5] .............................................. F16H 13/10
[52] U.S. Cl. .................................................. 74/200
[58] Field of Search ................. 74/190, 198, 200, 208; 475/185, 190, 191, 192, 195, 197

[56] References Cited

U.S. PATENT DOCUMENTS

| | | | |
|---|---|---|---|
| 4,086,820 | 5/1978 | Kraus et al. | 74/200 |
| 4,386,536 | 6/1983 | Kraus | 74/200 |
| 4,428,246 | 1/1984 | Horton et al. | 74/190 X |
| 4,484,487 | 11/1984 | Kraus | 74/190 X |
| 4,576,055 | 3/1986 | Kraus | 74/200 |
| 4,702,118 | 10/1987 | Kraus | 74/200 |
| 4,964,312 | 10/1990 | Kraus | 74/200 X |
| 4,974,466 | 12/1990 | Kraus et al. | 74/200 |
| 4,996,891 | 3/1991 | Kraus et al. | 74/200 |

Primary Examiner—Leslie A. Braun
Assistant Examiner—Ryan W. Massey

[57] ABSTRACT

In an infinitely variable transmission wherein two toric traction discs are rotatably supported opposite one another so as to define therebetween a toric cavity in which at least two motion transmitting traction rollers are disposed in engagement with the toric discs and supported by pivot trunnions, means are provided for controllably pivoting the trunnions about a control axis which is essentially tangential to the center circle of the toric cavity and wherein the pivot trunnions have support rollers supported on partial circular track structures with end sections extending inwardly from the circular track structure so as to apply increased engagement forces to the traction rollers in the pivotal end positions of the trunnions while at the same time limiting their pivotal movement.

4 Claims, 4 Drawing Sheets

INFINITELY VARIABLE TRACTION ROLLER TRANSMISSION

BACKGROUND OF THE INVENTION

The invention relates to an infinitely variable traction roller transmission in which power is transmitted through traction rollers pivotally supported between toric input and output discs.

In such transmissions, the traction rollers are mounted on support structures which, when pivoted, cause engagement of the traction rollers with the toric discs in circles of varying diameters depending on the desired transmission ratio. The pivotal traction roller support structures are so supported that they can be moved axially for initiating a change in the transmission ratio. For example, two traction rollers may be supported opposite one another by flexible tension sheets as shown in U.S. Pat. No. 4,086,820 which issued May 2, 1978 to Charles E. Kraus.

In U.S. Pat. No. 4,858,484 by Charles E. Kraus in which two traction rollers are arranged between, and in engagement with, opposite toric traction discs for the transmission of motion therebetween, each traction roller is supported by a pivotal support trunnion which has support rollers disposed at opposite ends thereof and supported on partial circular tracks disposed on the housing's inner surface for direct trunnion support. The traction rollers are supported on the pivot trunnions by force transmitting means which, for inexpensive transmissions, include stacks of Belleville springs. The housing tracks may have a center of curvature which is slightly off-set with regard to the pivot axis of the trunnions in order to provide greater compression of the Belleville spring, that is, greater disc engagement forces in one pivotal end position of the pivot trunnions than in their opposite pivotal end positions.

In the arrangement according to U.S. Pat. No. 4,974,466 cross-links are mounted to the axial ends of the trunnions so as to permit pivotal motion thereof only in unison and in an opposite sense, and the cross-links have overlapping center sections with opposing stop surfaces so arranged as to engage one another in the pivotal end positions of the trunnions for limiting their pivotal movement.

Upon engagement with one another the stop surfaces bring the pivoting movement of the trunnions to a sudden stop, which under certain conditions, may cause slippage between the traction rollers and the traction discs.

It is the principal object of the present invention to avoid slippage under the given circumstances.

SUMMARY OF THE INVENTION

This is achieved by an infinitely variable traction roller transmission with two toric traction discs rotatably supported opposite one another so as to define therebetween a toric cavity in which at least two traction rollers are disposed in radial symmetry in engagement with the toric discs and supported by pivot trunnions pivoting about a control axis which is essentially tangential to the center circle of the toric cavity and wherein each of the pivot trunnions has at least one support roller mounted thereon so as to be adapted to roll along a partial circular track structure arranged adjacent the pivot trunnion, the track structure having end sections extending inwardly from the circular track so as to apply increased engagement forces to the traction rollers when the trunnions reach their pivotal end positions.

The end positions accordingly are not defined by mechanical stop structures but rather by greatly increased engagement forces which, when the trunnions reach the pivotal end positions, prevent slipping of the traction rollers when they are no longer in a position to limit torque by changing the transmission ratio.

SHORT DESCRIPTION OF THE DRAWINGS

DESCRIPTION OF THE PREFERRED EMBODIMENT

Figure 1:
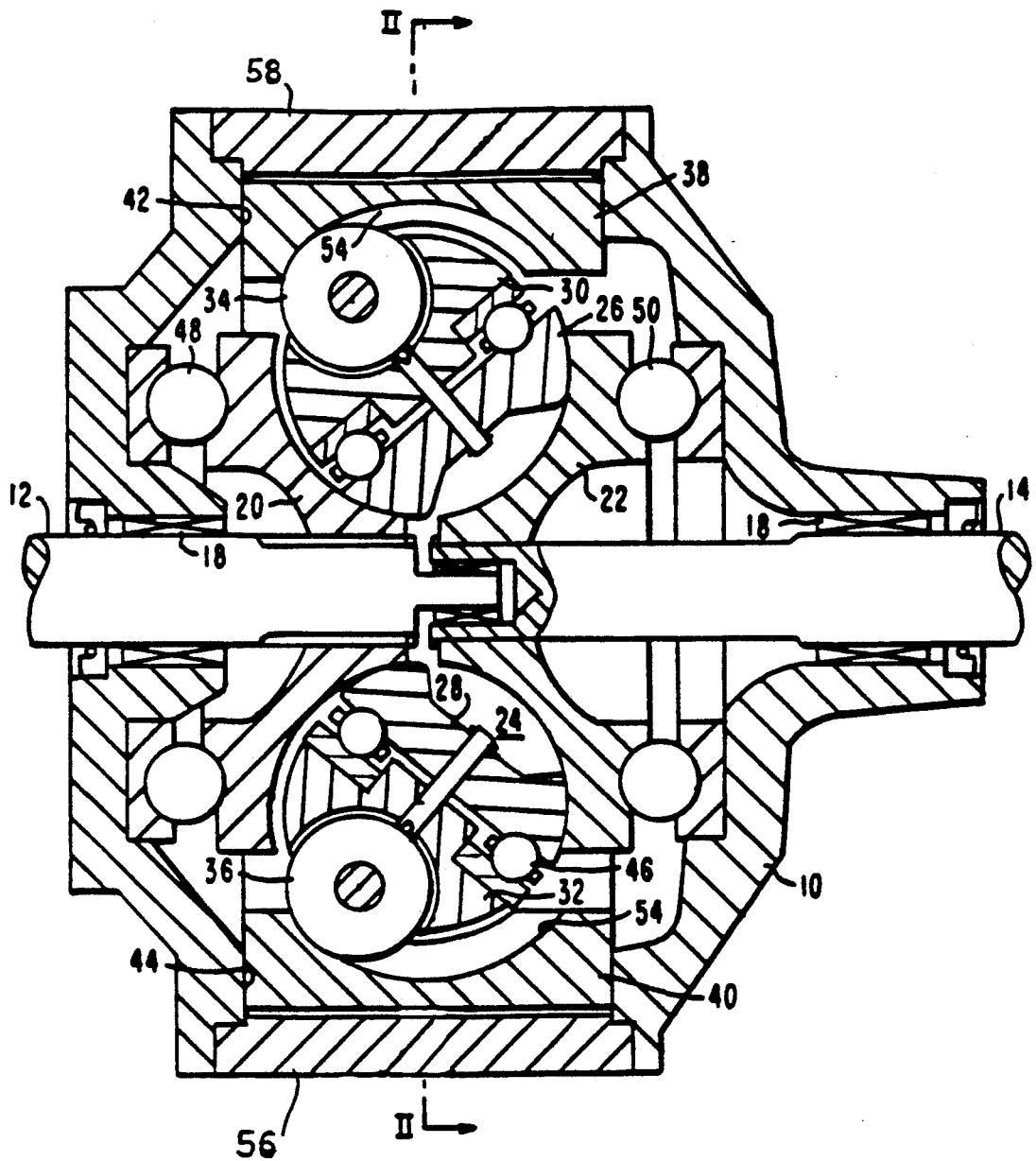
FIG. 1 is an axial cross-sectional view of the traction roller transmission.

A simple traction roller transmission as shown in FIG. 1 consists of a housing 10 having coaxial input and output shafts 12, 14 rotatably supported therein by bearings 16 and 18. Associated with the input and output shafts 12, 14 are toric discs 20, 22 which are so arranged opposite one another that a toric cavity 24 of circular cross-section is defined therebetween. Within the toric cavity 24 traction rollers 26, 28 are rotatably supported in engagement with the toric traction discs 20, 22. The traction rollers 26, 28 are supported in the housing 10 by pivot trunnions 30 and 32 which are pivotally supported by way of trunnion rollers 34 and 36 running on hard metal track members 38, 40 received in track cavities 42, 44 formed in the housing 10. Each of the pivot trunnions 30, 32 carries a traction roller bearing 46 for rotatably supporting the associated traction rollers 26, 28 which are forced into firm engagement with the traction discs 20 and 22 by way of the trunnion rollers 34, 36, the traction discs 20 and 22 being axially supported by axial thrust bearings 48 and 50. The engagement forces of the traction rollers 26, 28 with the toric traction discs 20, 22 depend on the loading applied by the track members 38, 40. Generally circular support grooves 54 in the track members 38, 40 may be slightly eccentric with respect to the center circle of curvature of the toric cavity 24 in order to provide larger contact forces for the traction rollers in one pivotal end position of the pivot trunnions 30 and 32, specifically, in the position for lowest output shaft speed and highest output shaft torque as shown in FIG. 1.

Figure 2:
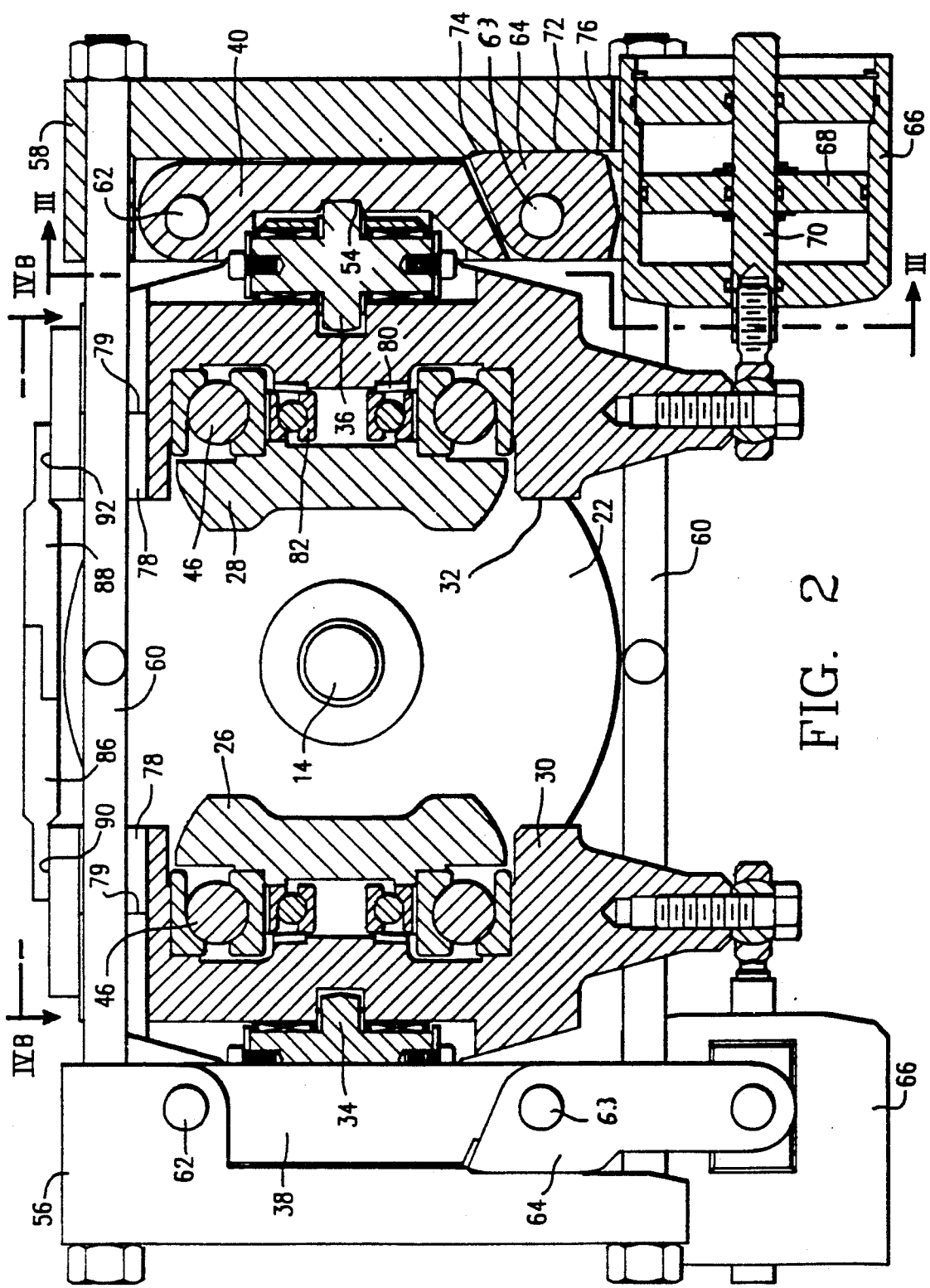
FIG. 2 is a cross-sectional view along line II—II of FIG. 1.

FIG. 2 shows the transmission without a housing. There are opposite support members 56 and 58 which are held together by retaining rods 60. The track members 38 and 40 are pivotally supported at one end by pivotal supports or by hinges 62 as shown in the drawings. At their other ends they are hinged by hinge pins 63 to leverage arms 64 which abut the support members 56 and 58. The support members 56 and 58 carry operating cylinders 66 provided with pistons 68 and piston rods 70 which are linked to the control ends of the trunnions 30 and 32. The trunnions 30 and 32 carry the traction rollers 26 and 28 as mentioned earlier and are forced toward the toric discs 20 and 22 by the track members 38 and 40 with forces which depend on the forces applied by the pistons 68 and piston rods 70 to the adjacent control ends of the trunnions 30 and 32 and which are generated by the reaction forces transmitted from the cylinder 66 to the cylinder support ends of the leverage arms 64. The leverage arms 64 have force control surfaces 72 which provide for some leverage to multiply the traction roller engagement forces applied to the trunnions 30 and 32 by way of the trunnion rollers 34 and 36.

Preferably the force control surfaces 72 of the leverage arm 64 are somewhat curved at their opposite ends 74 and 76 to provide for reduced wear at their tilting edges. The leverage arms 64 are preferably forked with the cylinders 66 received between the forked arms 65 and linked to the free ends of the trunnions 30, 32.

Figure 3:
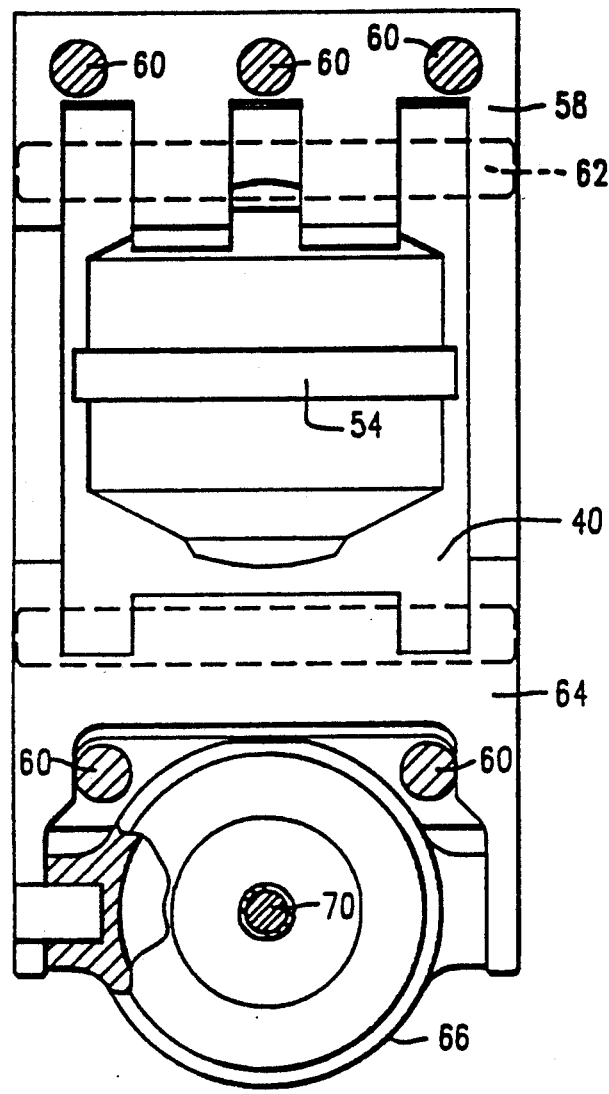
FIG. 3 is a view along line III—III of FIG. 2.

As shown in FIG. 3 there are two retaining rods 60 extending between the support members 56 and 58 at one side of the transmission and three at the opposite side thereof, a center retaining rod and two outer retaining rods. Adjacent the center rod 60 the trunnions 30, 32 are provided with grooves 78 which receive the center rod 60 and which are so shaped and sized that the freedom of the trunnions is limited by their engagement of the center rod 60. The narrowest center sections 79 of the grooves 78 are disposed in a plane receiving the pivot axis of the trunnions.

The traction roller bearings 46 as shown in FIG. 2 are such that they permit inward movement of the traction rollers into engagement with the toric discs by the force of the Belleville springs 80 applied through the auxiliary bearings 82 in order to keep the traction rollers in engagement with the toric discs 20, 22 even when no torque is transmitted through the transmission.

Figure 4A:
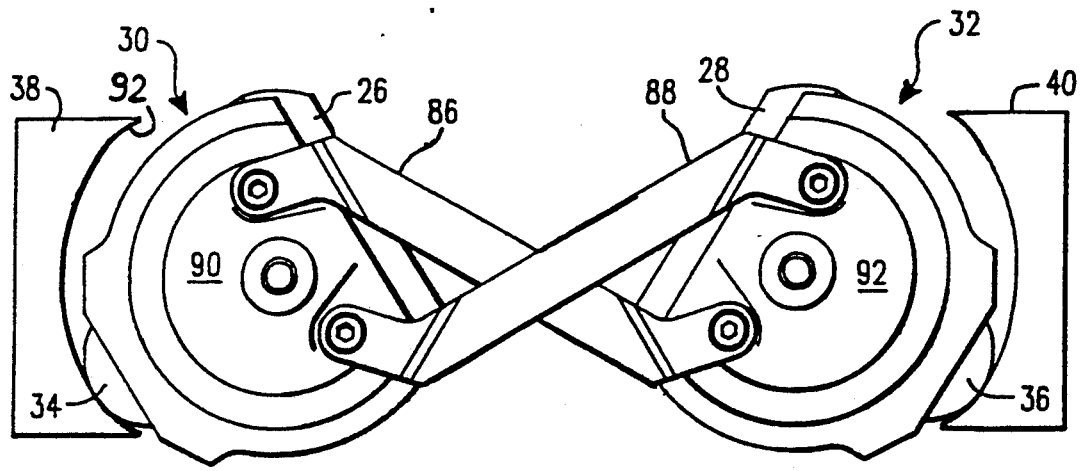
FIGS. 4A and 4B are views along lines IV—IV of FIG. 2 for different trunnion pivot positions.
Figure 4B:
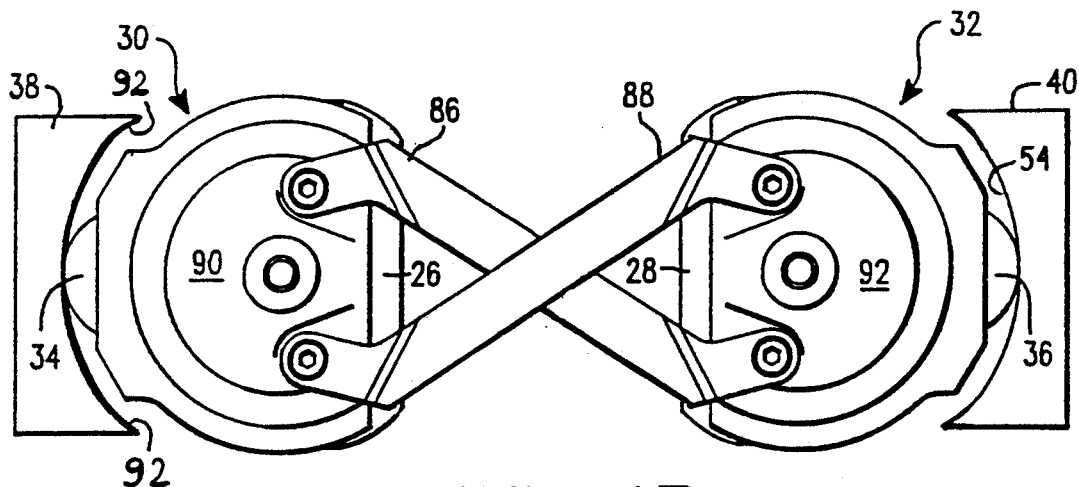

In order to insure movement of the trunnions in unison, they have cross-links 86 and 88 pivotally mounted to their end faces 90, 92 as shown more clearly in FIG. 4. The links 86, 88 permit pivoting of the trunnions 30 and 32 only in the opposite sense and in unison. In order to limit pivoting of the trunnions, the support grooves 54 have, at their opposite ends, inwardly inclined areas or areas of increased curvature which limit the path for the support rollers 34, 36. The areas 92 preferably have a curvature slightly smaller than the curvature of the support rollers 34, 36 in order to cause the support rollers 34, 36 to ride up on the inclined area thereby increasing the contact pressure for the traction roller when the trunnions suddenly come to their pivoting end positions in order to prevent slipping.

Operation of the Trunnion Support Arrangement

Whenever a torque is transmitted through the transmission there is a reaction moment applied to the trunnions 30, 32 by the traction rollers 26, 28 which is taken up by the cylinder 66. The cylinders 66 transmit the respective reaction force to the leverage arm 64 by which they are supported and which are pivoted thereby so as to force the track members 38 and 40 and the associated traction rollers 26 and 28 toward one another and into firm engagement with the toric discs 20, 22 with a force which is proportional to the torque transmitted through the transmission.

For a change of the transmission ratio, admission of pressurized fluid to the cylinders 66 at the appropiate side of the piston 68 is controlled so as to tilt the two trunnions 30, 32 slightly in the same circumferential sense with respect to the axis of the toric discs 20, 22 such that, upon rotation of the toric discs 20, 22, the traction rollers 26, 28 will roll to larger circles of engagement with one and smaller circles of engagement with the other of the toric discs 20, 22. When the desired transmission ratio is reached, the trunnions 30, 32 are returned to their neutral positions in which the momentary transmission ratio is maintained.

The cross-links 86, 88 insure the proper transmission ratio setting for both of the trunnions 30, 32 so that slipping of the traction rollers 26, 28 as a result of unequal pivot positions is avoided. The transmission ratio range is limited and slipping upon reaching the end positions is prevented as the traction rollers 26, 28 are forced into firmer engagement with the toric discs 20, 22 when the support rollers 34, 36 reach and are engaged by the end areas 92 of increased inward inclination of the support grooves 54. For each trunnion 30 and 32 there may be two spaced support rollers as shown in Applicant's U.S. Pat. No. 4,858,484 or there may be only one support roller as described herein and as also shown in Applicant's U.S. Pat. Nos. 4,964,312 and 4,974,466.

What is claimed is:

1. An infinitely variable traction roller transmission comprising: a support structure; two toric traction discs rotatably supported by said support structure, one for rotation with an input shaft and the other for rotation with an output shaft, said toric discs having opposite traction surfaces defining therebetween a toric cavity of circular cross-section; at least two motion transmitting traction rollers arranged in said toric cavity in radial symmetry and in engagement with said toric discs for the transmission of motion therebetween, each of said traction rollers being rotatably supported by a pivot trunnion for pivoting about a control axis which is essentially tangential to the center circle of said toric cavity, each of said pivot trunnions having at least one support roller mounted thereon and a partial circular path track structure arranged adjacent each pivot trunnion and supporting each support roller thereof, said track structures having end sections extending inwardly from the circular path so as to apply increased engagement forces to the traction rollers when the trunnions reach their pivot end positions.

2. An infinitely variable transmission according to claim 1, wherein the end sections have a curvature which is greater than that of the circular track structure but smaller than that of the support roller surface.

3. An infinitely variable transmission according to claim 1, wherein two oppositely arranged trunnions are provided and cross-links are mounted to the end faces of the trunnions so as to permit pivoting of said trunnions only in an opposite sense.

4. An infinitely variable transmission according to claim 1, wherein said partial circular track structure has a curvature which is slightly eccentric with respect to the traction roller pivot axis which is a tangential line to the center circle of the toric cavity.

* * * * *